United States Patent
Hisamitsu

(10) Patent No.: US 8,417,281 B2
(45) Date of Patent: Apr. 9, 2013

(54) COMMUNICATION TERMINAL WITH CAMERA

(75) Inventor: Takanobu Hisamitsu, Osaka (JP)

(73) Assignee: Kyocera Corporation, Kyoto (JP)

( * ) Notice: Subject to any disclaimer, the term of this patent is extended or adjusted under 35 U.S.C. 154(b) by 1403 days.

(21) Appl. No.: 11/843,203

(22) Filed: Aug. 22, 2007

(65) Prior Publication Data

US 2008/0051063 A1    Feb. 28, 2008

(30) Foreign Application Priority Data

Aug. 22, 2006   (JP) ................. 2006-224820

(51) Int. Cl.
*H04M 1/00*   (2006.01)
(52) U.S. Cl. .............. 455/550.1; 455/412.1; 455/412.2; 455/556.1
(58) Field of Classification Search .............. 455/412.1, 455/412.2, 550.1, 556.1
See application file for complete search history.

(56) References Cited

U.S. PATENT DOCUMENTS

| | | | |
|---|---|---|---|
| 2004/0235494 A1* | 11/2004 | Matsumoto et al. | 455/456.1 |
| 2005/0073665 A1* | 4/2005 | Taniguchi et al. | 355/53 |
| 2005/0186946 A1* | 8/2005 | Takahashi | 455/413 |
| 2007/0165955 A1* | 7/2007 | Hwang et al. | 382/232 |

FOREIGN PATENT DOCUMENTS

JP    2004-140613 A    5/2004

* cited by examiner

*Primary Examiner* — Kamran Afshar
*Assistant Examiner* — Shahriar Behnamian
(74) *Attorney, Agent, or Firm* — Leason Ellis LLP.

(57) ABSTRACT

A communication terminal with a camera includes a communicator for processing the sending and receiving of mail messages, a designator for designating any one of the mail messages received by the communicator as a browsing mail message, and a determiner for determining whether there is an image related to the browsing mail message. When a determination result by the determiner is negative, a first validator validates a defined camera setting, and when a determination result by the determiner is affirmative, a second validator validates a camera setting compliant with the related image. A creator creates an image along with the camera setting validated by the first validator or the second validator, and an attacher attaches the image created by the creator to a mail message using a sending source of the browsing mail message as a destination.

12 Claims, 11 Drawing Sheets

(A)

(B)

(C)

(D)

(E) 38

(F) 38

(B)

(B)

(B)

COMMUNICATION TERMINAL WITH CAMERA

INCORPORATION BY REFERENCE

The present application claims priority under 35 U.S.C. §119 to Japanese Patent Application No. 2006-224820 filed on Aug. 22, 2006. The content of the application is incorporated herein by reference in its entirety.

BACKGROUND OF THE INVENTION

1. Field of the Invention

The present invention relates to a communication terminal with a camera. More specifically, the present invention relates to a communication terminal with a camera which sends and receives an e-mail message attached with an image.

2. Description of the Related Art

In conventional apparatuses of such a kind, a CCD formed on an imaging unit outputs a sensor output image in a VGA size ((horizontal) 640 pixels×(vertical) 480 pixels). On the sensor output image, signal processing such as YC processing, white balance processing, etc. are performed by a signal processing unit. A resize processing unit converts an aspect ratio (4:3) of the YUV data output from the signal processing unit into an aspect ratio (11:9) along a QCIF size ((horizontal) 176 pixels×(vertical) 144 pixels). The resize processing also performs reduction processing on the YUV data so as to make it equal to or larger than the larger one out of the two, the display size of an encoded image and the display size of a display image. Consequently, it is possible to generate YUV data satisfying a common element (aspect ratio and maximum display size) of the encoded image to be recorded and the display image to be displayed.

However, in the related art, the record image that is imaged according to the imager setting of one communication terminal is sent to the other communication terminal without taking it into account that a camera setting of the other communication terminal. On the monitor of the other communication terminal, an image is displayed in a display size according to the imager setting of the one communication terminal. Thus, on the monitor of the other communication terminal, an image imaged by the one communication terminal may not be displayed properly.

SUMMARY OF THE INVENTION

A communication terminal with a camera according to the present invention comprises a communicator for processing the sending and receiving of mail messages; a designator for designating any one of the mail messages received by the communicator as a browsing mail message; a determiner for determining whether or not there is an image relating to the browsing mail message; a first validator for validating a defined camera setting when a determination result by the determiner is negative; a second validator for validating a camera setting as compliant with the related image when a determination result by the determiner is affirmative; a creator for creating an image compliant with the camera setting validated by the first validator or the second validator; and an attacher for attaching the image created by the creator to a mail message using a sending source of the browsing mail message as a destination.

The objects, features, and advantages of the present invention will become more apparent from the following detailed description of the present invention when taken in conjunction with the accompanying drawings.

DETAILED DESCRIPTION OF THE PREFERRED EMBODIMENTS

Figure 1:
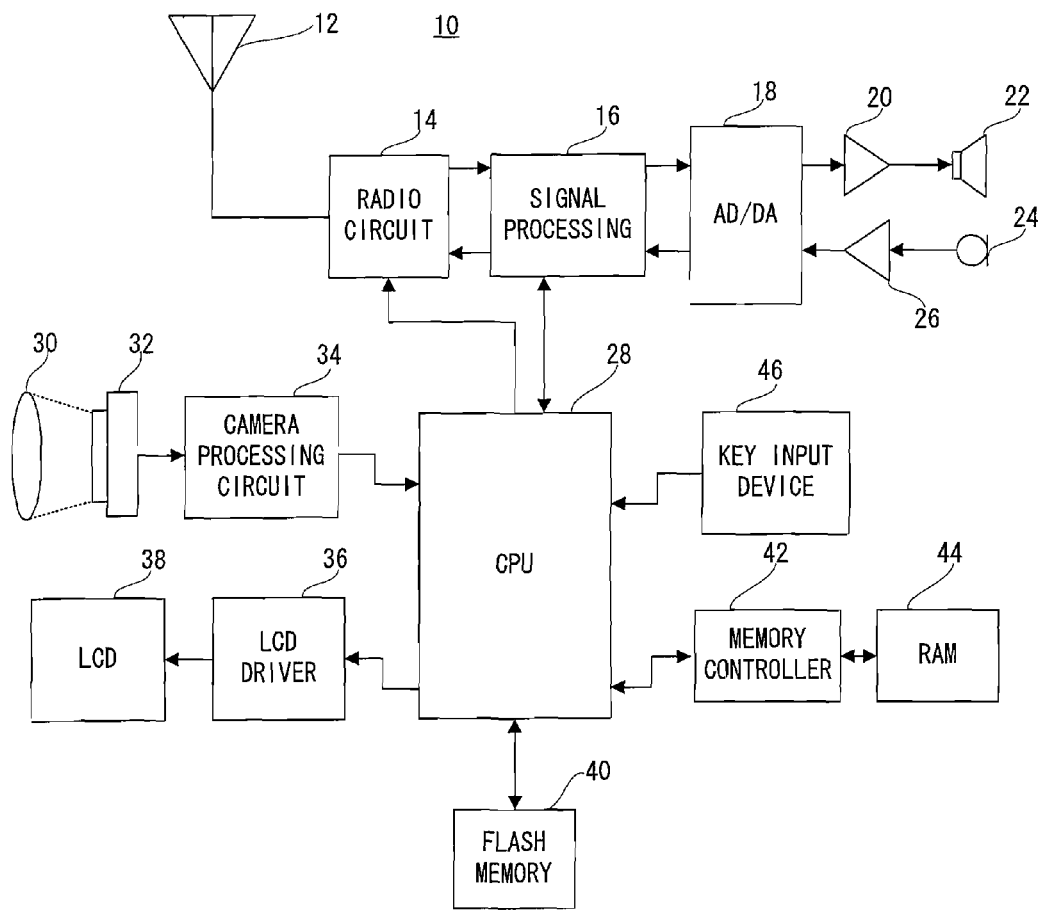
FIG. 1 is a block diagram showing a configuration of an embodiment according to the present invention.

Referring to FIG. 1, a communication terminal 10 with a camera 32 of one embodiment according to the present invention includes an antenna 12. A modulated audio signal (high frequency signal) sent from an opposite party is received by the antenna 12, is subjected to demodulation processing by a radio circuit 14, and is then subjected to decode processing by a signal processing circuit 16. The audio data decoded by the signal processing circuit 16 is converted into an analog audio signal by an AD/DA conversion circuit 18, and the converted audio signal is output from a speaker 22 via an amplifier 20. When a call-in operation is initiated, that is, when a button is depressed on a key input device 46, a speech possible state is brought about.

On the other hand, when a call-out operation for communication is performed by depressing a key on the key input device 46, the CPU 28 sends a call-out signal to a mobile terminal of the opposite party (not shown) through the signal processing circuit 16, the radio circuit 14 and the antenna 12. When the opposite party performs an incoming operation in response thereto, a speech possible state is brought about.

An audio signal caught by a microphone 24 after the speech possible state is brought about is amplified by an amplifier 26, and converted into audio data in the form of a digital signal by the AD/DA conversion circuit 18. The converted audio data is subjected to encoding by the signal processing circuit 16, and is further subjected to modulation by the radio circuit 14. The modulated audio signal generated by the radio circuit 14 is sent from the antenna 12.

When a speech ending operation is performed by the key input device 46 during the speech with the opposite party as described above, the CPU 28 sends a speech end signal to the opposite party by controlling the signal processing circuit 16 and the radio circuit 14. After completion of the sending of the speech end signal, the CPU 28 ends the speech processing. Also, in a case where a speech end signal is first received from the opposite party, the CPU 28 ends the speech processing. Thus, it is possible to realize a telephone call function.

The communication terminal 10 with camera 32 in this embodiment includes the CPU 28, and the CPU 28 has a plurality of operation modes. The plurality of operation modes includes a camera mode for imaging an optical image of an object scene obtained via an optical lens 30 provided to the communication terminal with camera 32, and a browsing mode for browsing a received e-mail message.

Figure 2:
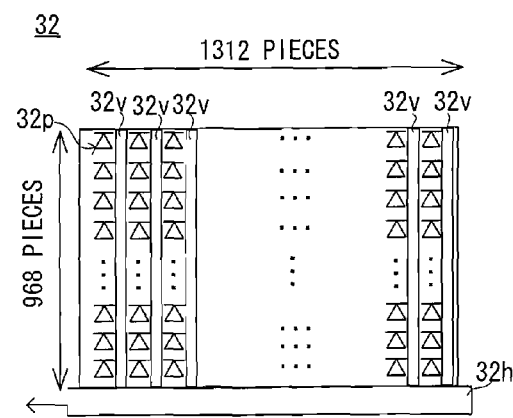
FIG. 2 is an illustrative view showing one example of a configuration of an image sensor applied to FIG. 1 embodiment.

An optical image of an object scene is irradiated onto an imaging surface of a camera or image sensor 32 through the optical lens 30. With reference to FIG. 2, the image sensor 32 has a plurality of photoreceptors 32*p*, 32*p*, . . . arranged in plane on the imaging surface, a plurality of vertically transferring registers 32*v*, 32*v*, . . . attached to each of the plurality of columns of the photoreceptors, and a horizontally transferring register 32*h* provided at ends of the plurality of vertically transferring registers 32*v*, 32*v*, . . . . In an effective area, 968 of the photoreceptors 32*p* are arranged in a vertical direction corresponding to a short side of the image in the camera or sensor 32, and 1312 of the photoreceptors 32*p* are arranged in a horizontal direction corresponding to a long side of the image in the camera or sensor 32. Thus, RGB data generated from RAW data obtained from a reading area that is formed on the image sensor 32 correspond to 1280 pixels in the horizontal direction×960 pixels in the vertical direction, and the aspect ratio relating to such a maximum reading area is 3:4 (short side: long side). It should be noted that the vertical direction of the object scene is coincident with the 960 vertical pixels of the image sensor 32, and the horizontal direction of the object scene is coincident with the 1280 horizontal pixels of the image sensor 32.

Returning to FIG. 1, when a camera mode is selected by the key input device 46, a camera setting is initialized. More specifically, the CPU 28 reads a camera setting (imaging parameter) from a flash memory 40, and writes the read camera setting to a RAM 44 through a memory controller 42. The camera setting includes a "display manner" and a "display position". The "display manner" is defined by the number of horizontal pixels and the number of vertical pixels which define the reading area of the imaging surface, i.e., the image resolution, and the initial value of the display manner shows 1280 horizontal pixels×960 vertical pixels.

When the camera setting is initialized, an imaging task is activated. When the imaging task is activated, through image processing, that is, processing of displaying a real-time motion image (through-image) of the object scene on an LCD 38 is performed. More specifically, the CPU 28 calculates an aspect ratio from the "display manner" or image area of the camera setting stored in the RAM 44, designates a reading area from the calculated aspect ratio, and activates a camera processing circuit 34. To the camera processing circuit 34, a reading instruction corresponding to the designated reading area is applied.

The camera processing circuit 34 repeatedly reads a raw image signal based on the optical image of the object scene irradiated onto the imaging surface of the image sensor 32 from the image sensor 32 in response to the reading instruction issued from the CPU 28. Thus, the raw image signals having 1280 horizontal pixels×960 vertical pixels are output from the image sensor 32.

The read raw image signals are converted into image data in the form of digital data by the camera processing circuit 34. Each of the image data thus obtained is temporarily stored in the RAM 44 through the CPU 28. When image data corresponding to one frame is stored in the RAM 44, the stored image data is applied to an LCD driver 36 through the CPU 28. At this time, the CPU 28 issues a thinning-out reading instruction or reduced resolution instruction corresponding to the "display position" of the camera setting stored in the RAM 44 to the LCD driver 36. The LCD driver 36 outputs image data according to the thinning-out or reduced resolution reading instruction issued from the CPU 28 to the LCD 38. Thus, a low-resolution through-image representing an object scene is reproduced on the LCD 38.

When an imaging operation is performed by the key input device 46, imaging processing is executed. That is, a reading instruction is issued to the camera processing circuit 34, and image data on the basis of the raw image signals having horizontal 1280 pixels×vertical 960 pixels is stored in the RAM 44. When the image data created in response to the imaging operation is stored in the RAM 44, the CPU 28 performs compression processing associated with JPEG compression on the image data stored in the RAM 44, and the resolution compressed image data is stored in the RAM 44 again.

When the compressed image data is stored in the RAM 44, the compressed image data and the EXIF (Exchangeable Image File Format) information relating to the compressed image data are recorded in the flash memory 40 in a file format. In the EXIF information, the file number of the compressed image data and the camera setting of the compressed image data which are recorded together therewith are formed as attribute information.

Consequently, an image file including the compressed image data having 1280 horizontal pixels×960 vertical pixels is recorded in the flash memory 40. Thus, an image formed along the camera setting of the communication terminal with camera 10 is formed.

When a browsing mode is selected by the key input device 46, a browsing task is activated. At this time, the CPU 28 initializes a browsing destination, and sends any one of the received mail message as a mail message to be designated to be browsed (hereinafter referred to as a browsing mail message) to the RAM 44 from the flash memory 40.

When the browsing mail message is transferred to the RAM 44, the CPU 28 applies an instruction causing the display text data of the browsing mail message to be applied to the LCD driver 36. The LCD driver 36 reads text data from the RAM 44, and outputs the read text data on the LCD 38 according to the given displaying instruction. As a result, the text of the browsing mail message is displayed on the LCD 38.

Furthermore, the CPU 28 notes whether or not an image is attached to the browsing mail message. When an image is attached to the browsing mail message, the CPU 28 reads the image data of the browsing mail message from the RAM 44, and applies an instruction to display the read image data to the LCD driver 36. The LCD driver 36 outputs the read image data to the LCD 38 according to the applied display instruction. Thus, the text of the browsing mail message and the image of the browsing mail message are displayed on the LCD 38.

Here, when a change operation is initiated for changing a browsing destination of the browsing mail message by the key input device 46, the CPU 28 changes the browsing destination of the browsing mail message in response to the change operation. Furthermore, when an operation of creating a mail message directed to the sending source of the browsing mail message, that is, when a reply operation is performed by the key input device 46, the CPU 28 activates a reply task, and ends the browsing task. In addition, when an end operation is performed by the key input device 46, the CPU 28 ends the browsing task. Thus, the browsing of the received mail is realized.

Figure 3:
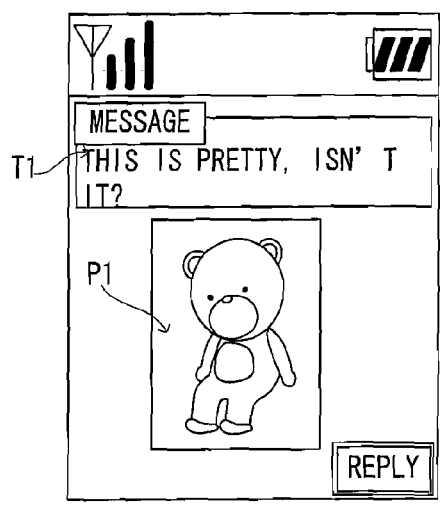
FIG. 3(A) is an illustrative view showing one example of an operation of an LCD applied to FIG. 1 embodiment.
FIG. 3(B) is an illustrative view showing another example of an operation of the LCD applied to FIG. 1 embodiment.
FIG. 3(C) is an illustrative view showing still another example of an operation of the LCD applied to FIG. 1 embodiment.
FIG. 3(D) is an illustrative view showing a further example of an operation of the LCD applied to FIG. 1 embodiment.
FIG. 3(E) is an illustrative view showing a still further example of an operation of the LCD applied to FIG. 1 embodiment.
FIG. 3(F) is an illustrative view showing the other example of an operation of the LCD applied to FIG. 1 embodiment.
Figure 3:
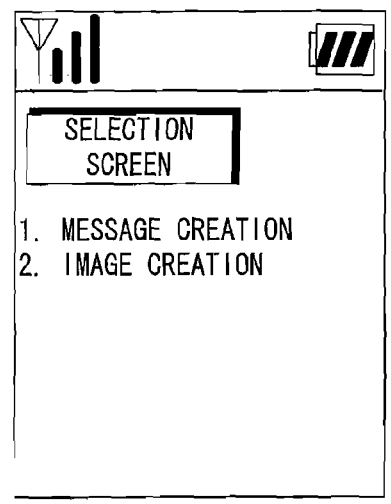
Figure 3:
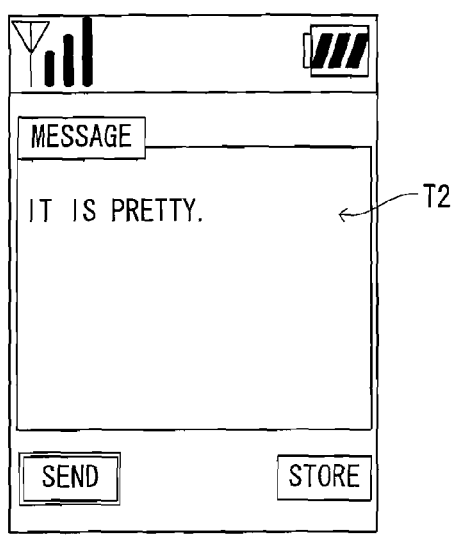
Figure 3:
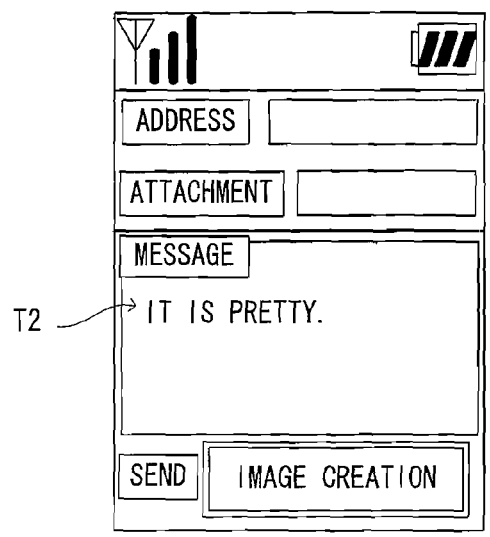
Figure 3:
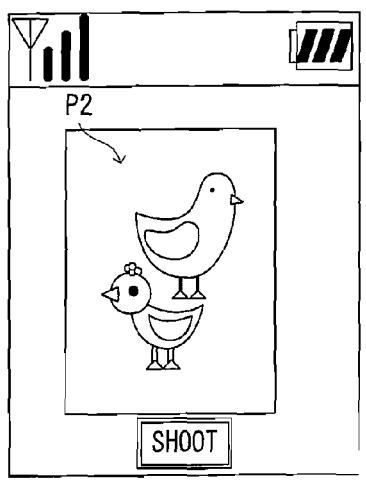
Figure 3:
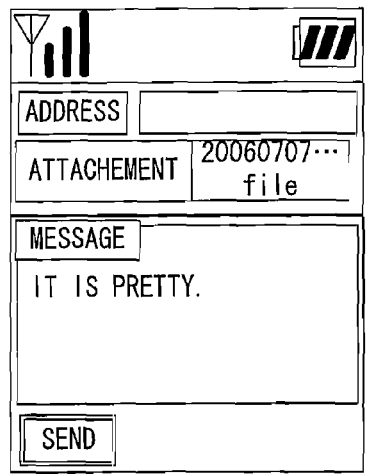
Figure 4:
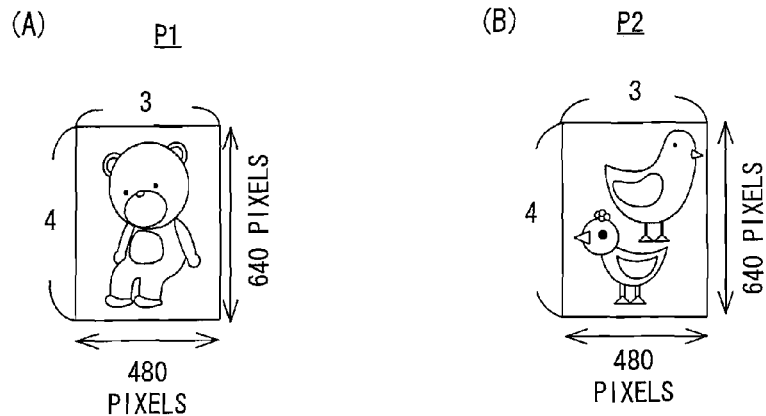
FIG. 4(A) is an illustrative view showing one example of an image P1 shown in FIG. 3(A)
FIG. 4(B) is an illustrative view showing one example of an image P2 shown in FIG. 3(E).

A description is made on reply processing in regard to the browsing mail message attached with an image with reference to FIG. 3(A)-FIG. 3(F), and FIG. 4(A) and FIG. 4(B). With reference to FIG. 3(A), when a reply operation is performed while a browsing mail message including an image P1 (see FIG. 4(A)) showing an aspect ratio of 3:4 and having the "display manner" of 480 horizontal pixels×640 vertical pixels and a text T1 is being displayed, a selection screen (see FIG. 3(B)) is displayed. On the selection screen, a selection item including "message creation" and "image creation" is formed.

When the "message creation" is selected, message creation processing is performed, and a text T2 (see FIG. 3(C)) created by the user with the key input device 46 is stored in the RAM 44. After completion of the message creation processing, a sending image display processing is executed. As a result, a sending screen having the text T2 (see FIG. 3(D)) is displayed on the LCD 38.

When the "image creation" displayed on the sending screen is selected, camera setting processing is performed, and an imaging task is activated. In the camera setting processing, it is noted whether or not there is a related image relating to the browsing mail message. The CPU 28 takes, here, the attached image P1 as a related image, and writes a camera setting that forms a part of the EXIF information of the image P1 in the RAM 44. The "display manner" of the camera setting written to the RAM 44 indicates 480 horizontal pixels×640 vertical pixels. Thus, the camera setting is adjusted to be compliant with the image attached to the browsing mail message.

After completion of the camera setting processing, the processing similar to the processing described above is executed, and a reading instruction corresponding to the 480 horizontal pixels×640 vertical pixels is applied to the camera processing circuit 34. When the image data of 480 horizontal pixels×640 vertical pixels is output from the camera processing circuit 34, the image data is temporarily stored in the RAM 44 through the CPU 28. To the LCD driver 36, the image data stored in the RAM 44 is applied through the CPU 28, and a thinning-out reading instruction corresponding to the "display position" of the camera setting stored in the RAM 44 is also applied. The LCD driver 36 outputs image data to the LCD 38 according to the thinning-out reading instruction issued from the CPU 28. Consequently, a through-image P2 (see FIG. 3(E)) of 480 horizontal pixels×640 vertical pixels is reproduced on the LCD 38.

When an imaging operation is performed by the key input device 46, a reading instruction corresponding to the reading area is issued to the camera processing circuit 34 as described above, image data on the basis of raw image signals output from the image sensor 32 is stored in the RAM 44, compression processing relating to the JPEG compression is performed on the image data stored in the RAM 44, compressed image data is stored in the RAM 44, and the compressed image data and the EXIF information relating to the compressed image data are recorded in the flash memory 40 in a file format. Thus, an image file including the compressed image data of 480 horizontal pixels×640 vertical pixels is recorded in the flash memory 40. As a result, the image being compliant with the camera setting of the opposite party can be created.

After completion of the record processing, an attachment flag is set to an on state. In addition, a sending screen (see FIG. 3(F)) including the file number of the image data and the text T2 is displayed on the LCD 38 by sending image display processing.

When a sending operation is performed by the key input device 46, text sending processing that is noted to the text T2 is executed. That is, the CPU 28 performs packet processing by noting the text T2 to thereby send a mail message formed by a plurality of packets thus obtained to a desired destination through the radio circuit 14.

After completion of the text sending processing, the CPU 28 notes the attachment flag. Since the attachment flag is an on state, the compressed image data created in response to the reply operation in order to attach the image file including the compressed image data of 480 horizontal pixels×640 vertical pixels to the text T2 sent to the desired destination is transferred from the flash memory 40 to the RAM 44, and then, attached image sending processing is executed. The CPU 28 performs packet processing on the compressed image data transferred to the RAM 44, and the mail message formed by a plurality of packets thus obtained is sent to the desired destination through the radio circuit 14. After completion of the sending processing, the attachment flag is set to an off state to end the reply task.

Figure 5:
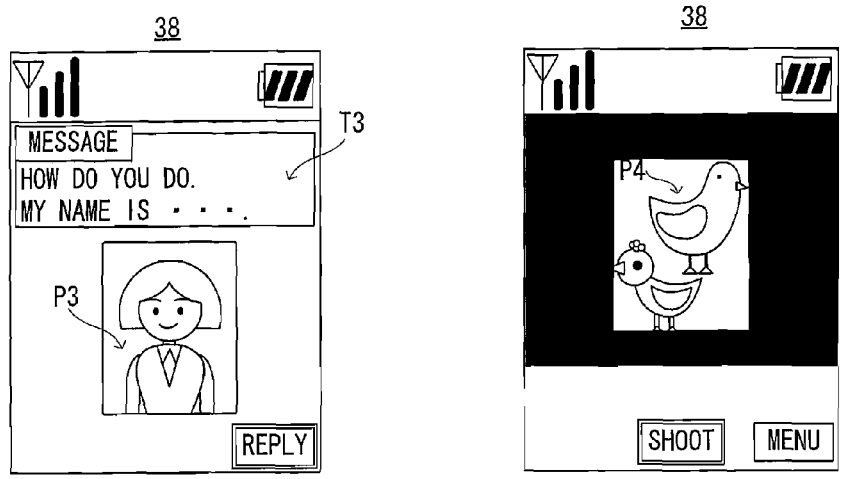
FIG. 5(A) is an illustrative view showing one example of an operation of the LCD applied to FIG. 1 embodiment.
FIG. 5(B) is an illustrative view showing another example of an operation of the LCD applied to FIG. 1 embodiment.
Figure 5:
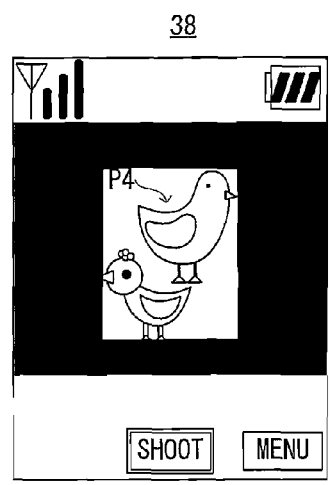
Figure 6:
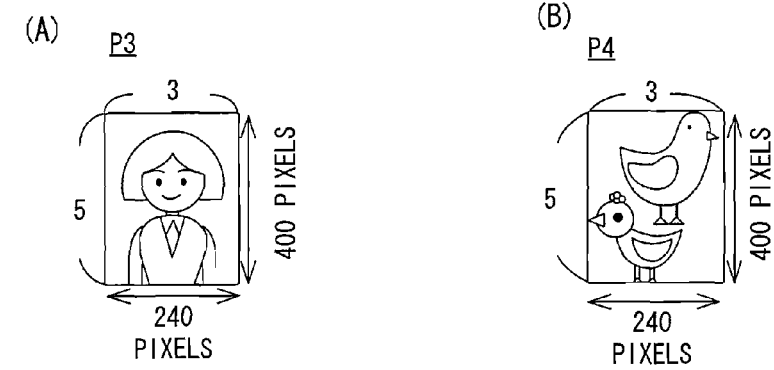
FIG. 6(A) is an illustrative view showing one example of the image P1 shown in FIG. 5(A)
FIG. 6(B) is an illustrative view showing one example of the image P2 shown in FIG. 5(B).

A description is made on reply processing with respect to a browsing mail message attached with an image P3 having aspect ratio different from the initial value of the aspect ratio with reference to FIG. 5(A) and FIG. 5(B), and FIG. 6(A) and FIG. 6(B). With reference to FIG. 5(A), when a reply operation is performed while a browsing mail message including the image P3 (see FIG. 6(A)) showing the aspect ratio of 3:5 and having the "display manner" of 240 horizontal pixels× 400 vertical pixels and a text T3 is displayed, a selection screen (see FIG. 3(B)) is displayed.

When the "image creation" is selected, camera setting processing is executed, and an imaging task is activated. It is noted whether or not there is a related image relating to the browsing mail message. At this time, the image P3 is noted as a related image, and the camera setting that is forming a part of the EXIF information of the image P3 is written to the RAM 44. The "display manner" of the camera setting written to the RAM 44 shows 240 horizontal pixels×400 vertical pixels. Thus, image data of 240 horizontal pixels×400 vertical pixels is stored in the RAM 44 in response to the imaging task.

When the image data representing the 240 horizontal pixels×400 vertical pixels is stored in the RAM 44, the LCD driver 36 reads display image data formed by the image data representing 240 horizontal pixels×400 vertical pixels and a black image formed so as to surround the image data from the RAM 44 in response to an instruction according to the "display position". Thus, as shown in FIG. 5(B), a through-image P4 (see FIG. 6(B)) showing the aspect ratio of 3:5 and having the 240 horizontal pixels×400 vertical pixels is displayed on the LCD 38.

When an imaging operation is performed by the key input device 46, the processing similar to the processing as described above is executed. As a result, an image file including compressed image data of 240 horizontal pixels×400 vertical pixels is recorded in the flash memory 40. After completion of the record processing, message creation processing is executed to thereby display the text on the basis of the message creation processing and the file number of the compressed image data on the LCD 38.

In a case that a reply operation is performed on the browsing mail message without an attached image, a selection screen (see FIG. 3(B)) is first displayed. When the "image creation" is selected, the CPU 28 executes camera setting processing, activates an imaging task, and notes whether or not there is a related image relating to the browsing mail message. At this time, since there is no image attached to the browsing mail message, the CPU 28 regards an image attached to the mail that the sending source who sent the browsing mail message has sent in the past (hereafter referred to as a sending source mail) as a related image, and notes whether or not there is such a related image. Thus, the past sending source mail is noted.

In a case that there is a related image attached to the sending source mail, the CPU 28 writes a camera setting that is forming a part of the EXIF information of the latest image out of the related images of the sending source mail to the RAM 44. Thus, it is possible to adjust the camera setting so as to be compliant with the opposite party. In a case that there is no related image attached to the sending source mail, the camera setting with the initial value is stored in the RAM 44. Thus, it is possible to realize an imaging function being compliant with the camera setting of the communication terminal with camera 10 of the opposite party.

Figure 7:
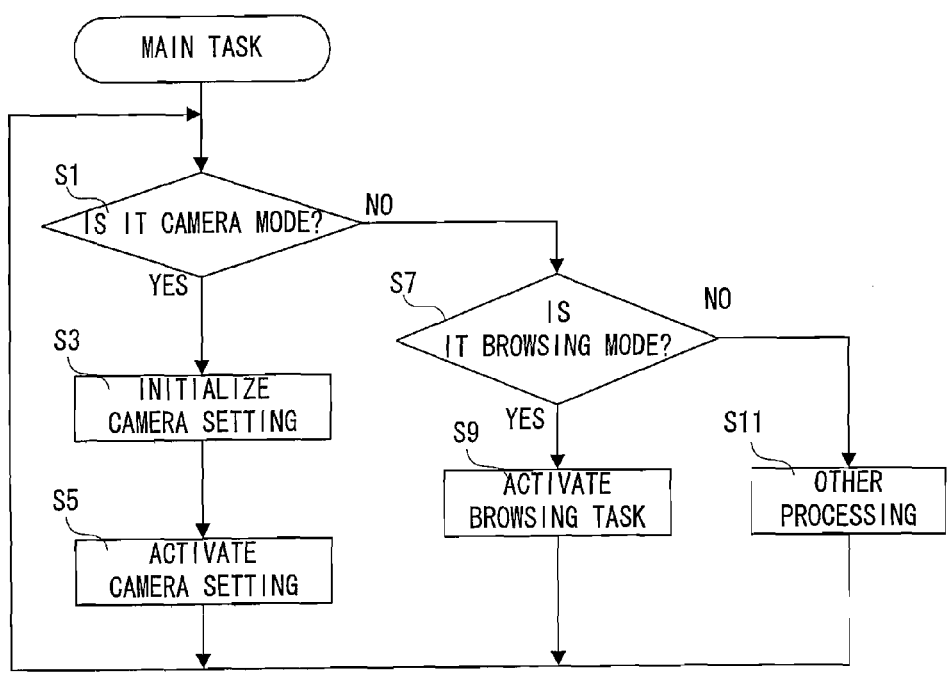
FIG. 7 is a flowchart showing a part of an operation of a CPU 28 applied to FIG. 1 embodiment.
Figure 8:
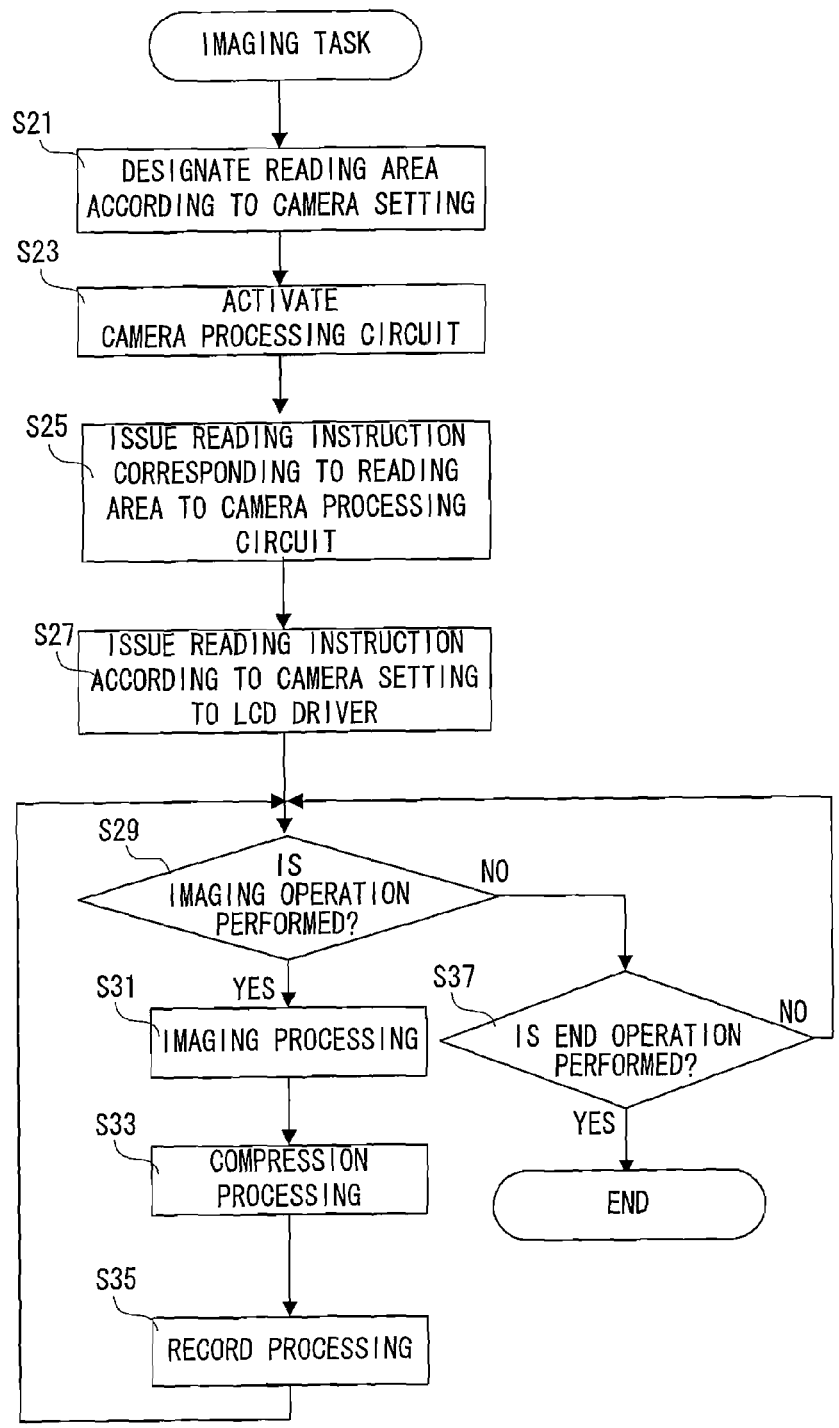
FIG. 8 is a flowchart showing another part of the operation of the CPU 28 applied to FIG. 1 embodiment.
Figure 9:
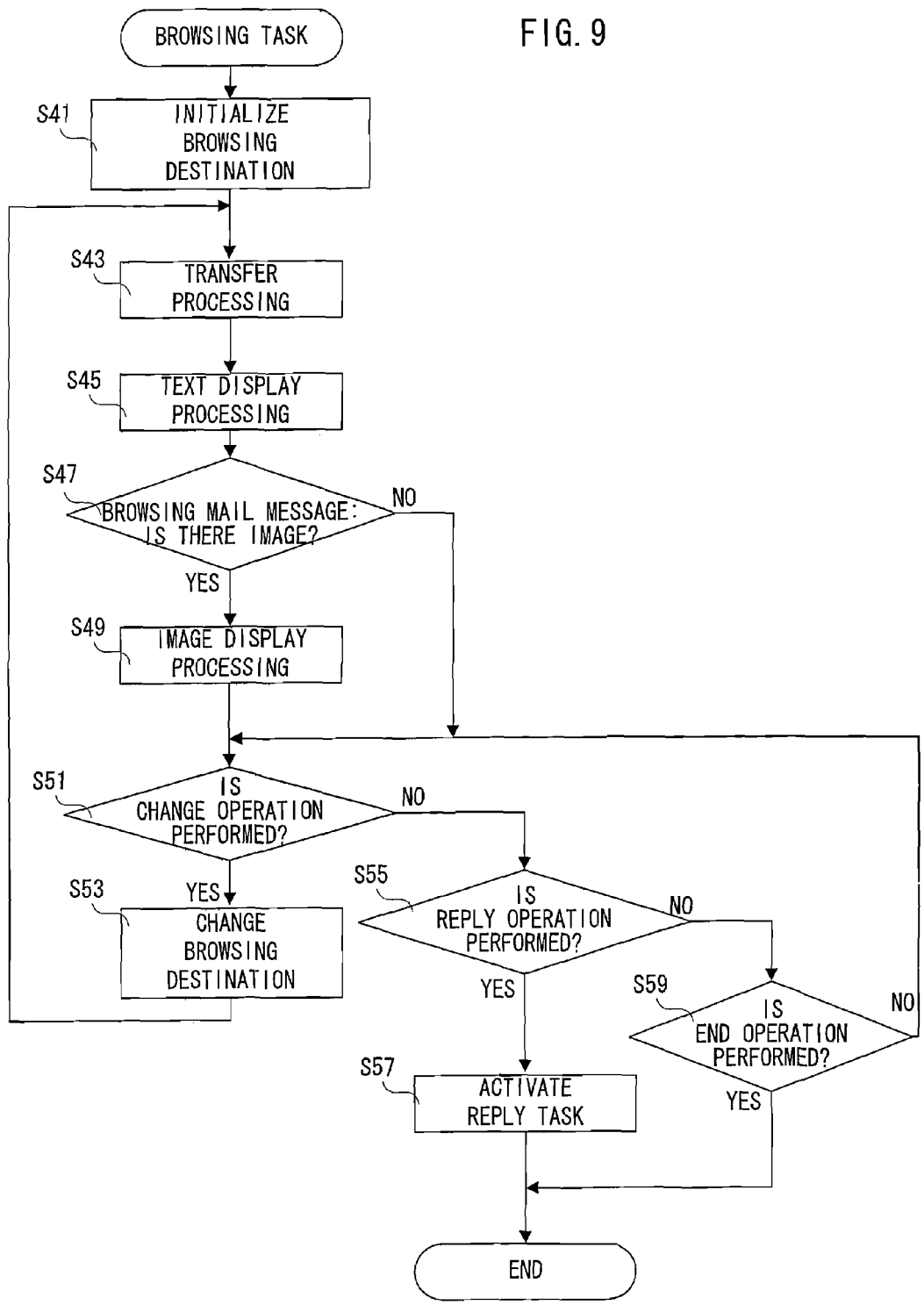
FIG. 9 is a flowchart showing still another part of the operation of the CPU 28 applied to FIG. 1 embodiment.
Figure 10:
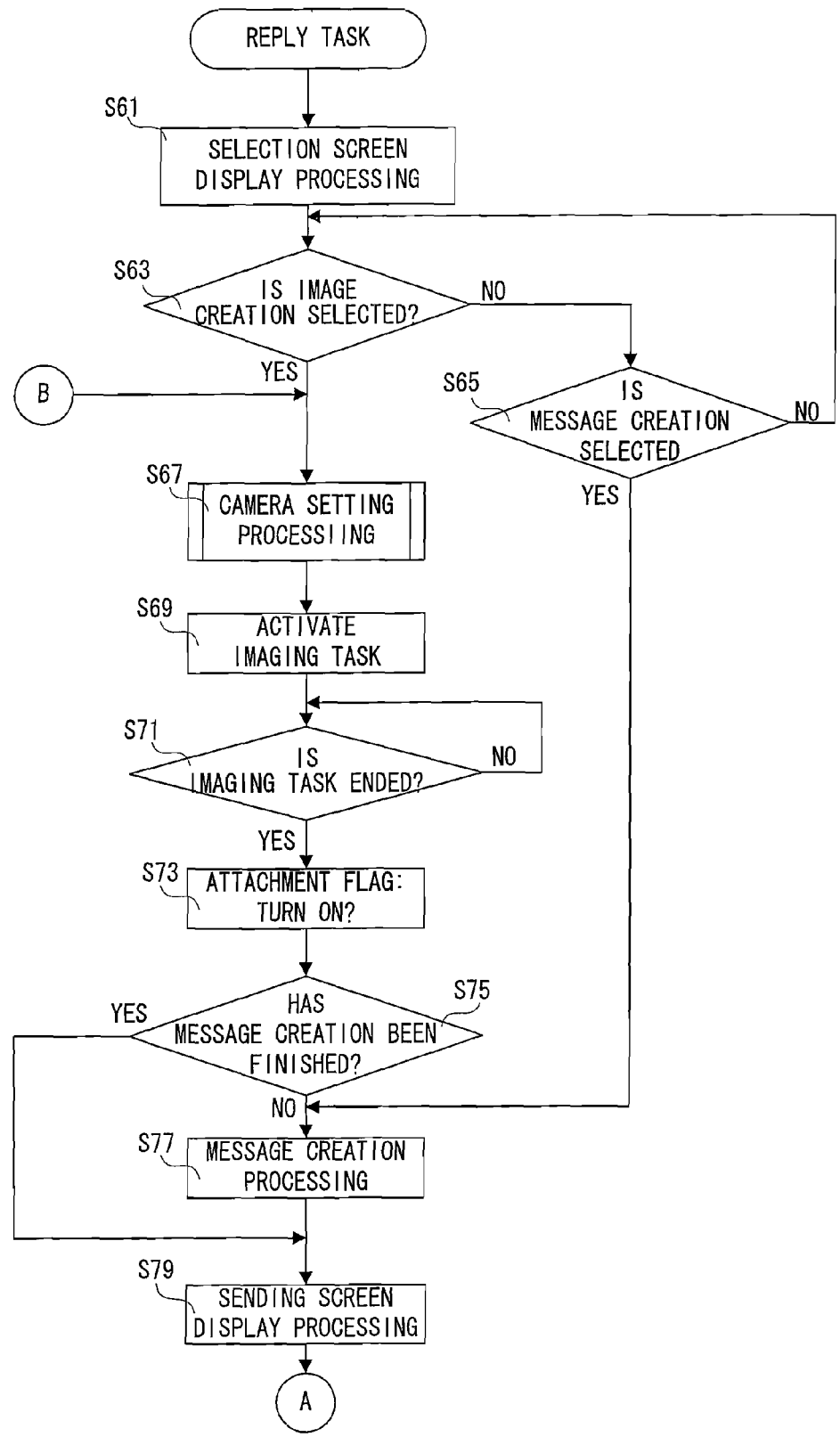
FIG. 10 is a flowchart showing a further part of the operation of the CPU 28 applied to FIG. 1 embodiment.
Figure 11:
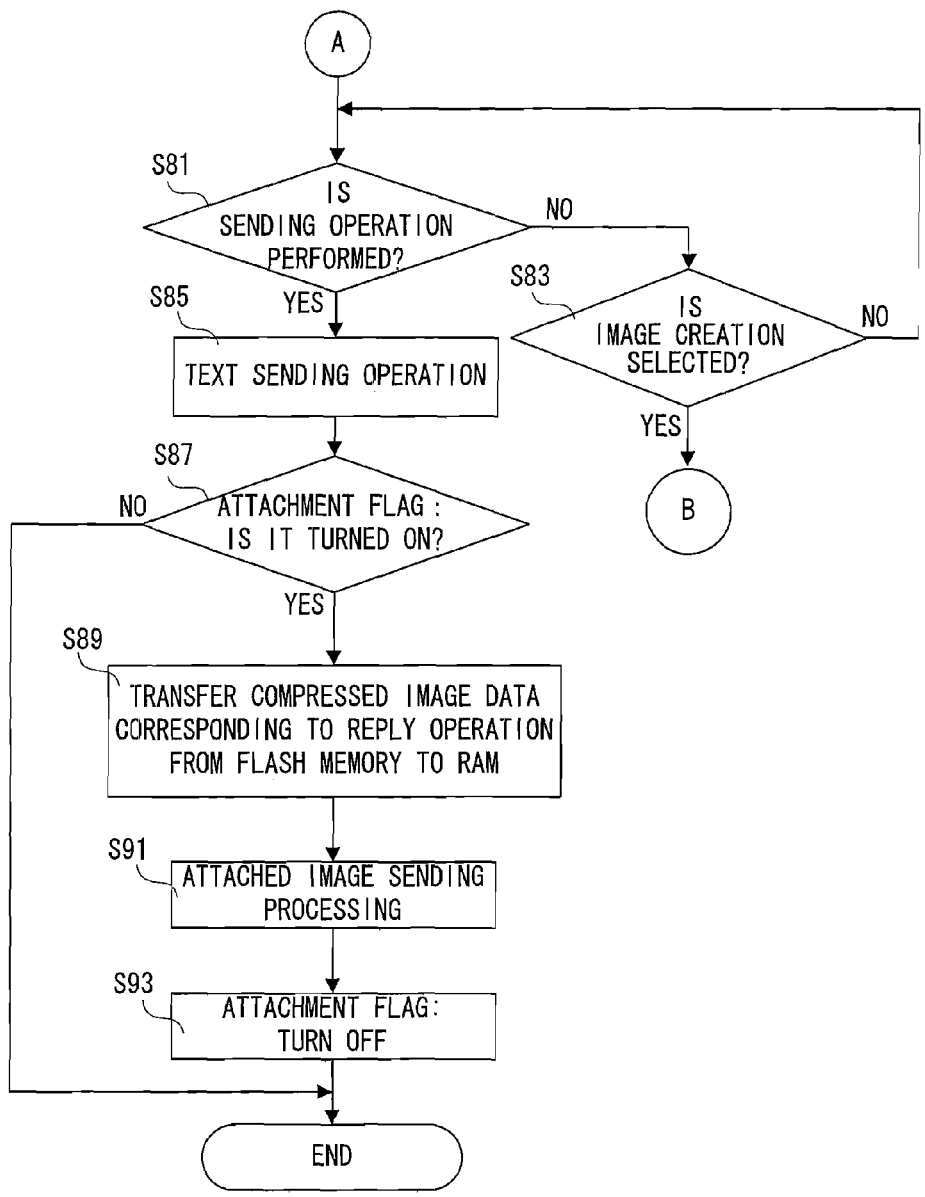
FIG. 11 is a flowchart showing a still further part of the operation of the CPU 28 applied to FIG. 1 embodiment.
Figure 12:
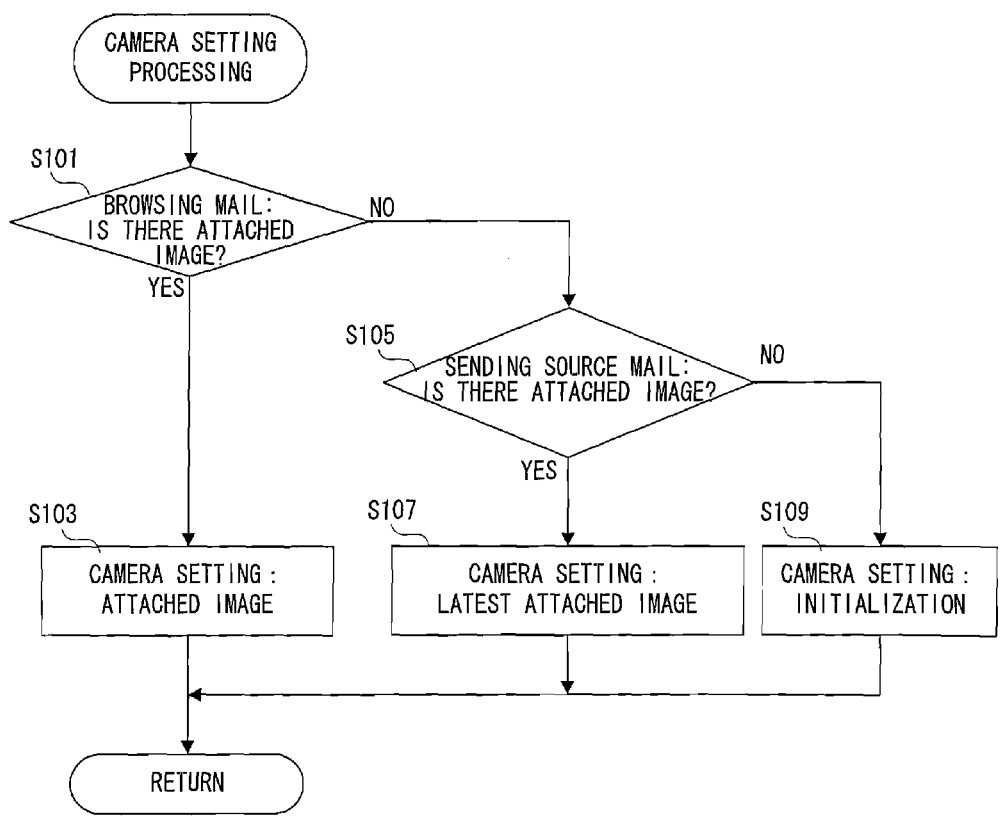
FIG. 12 is a flowchart showing the other part of the operation of the CPU 28 applied to FIG. 1 embodiment.

The CPU 28 executes a control of the flowchart shown in FIG. 7 in association with a main task, executes a control of the flowchart shown in FIG. 8 in association with an imaging task, executes a control of the flowchart shown in FIG. 9 in association with a browsing task, and executes a control of the flowchart shown in FIG. 10-FIG. 12 in association with a reply task. It should be noted that the control programs corresponding to the flowcharts are recorded in the flash memory 40.

With reference to FIG. 7, in a step S1, it is determined whether or not a camera mode is selected by the key input device 46. If the determination result is affirmative, a camera setting is initialized in a step S3. That is, a camera setting is read from the flash memory 40, and the read camera setting is written to the RAM 44 through the memory controller 42. In a step S5, an imaging task is activated, and the process returns to the step S1. If the determination result in the step S1 is negative, it is determined whether or not a browsing mode is selected by the key input device 46 in a step S7. If the determination result is affirmative, a browsing task is activated in a step S9, and the process returns to the step S1. If the determination result is negative, other processing is executed in a step S11, and the process then return to the step S1.

According to FIG. 8, in a step S21, a reading area of the imaging surface is designated according to the camera setting, and in a step S23, the camera processing circuit 34 is activated. In a step S25, a reading instruction corresponding to the designated reading area is issued to the camera processing circuit 34, and in a step S27, a reading instruction according to the "display position" of the camera setting is issued to the LCD driver 36.

In a step S29, it is determined whether or not an imaging operation is performed by the key input device 46. If the determination result is affirmative, imaging processing is executed in a step S31. When the image data thus obtained is stored in the RAM 44, compression processing relating to the JPEG compression is performed on the image data stored in the RAM 44 in a step S33. The obtained compressed image data is stored in the RAM 44 again. In a step S35, the compressed image data and the EXIF information relating to the compressed image data are recorded in the flash memory 40 in a file format, and the process then returns to the step S29.

If the determination result in the step S29 is negative, it is determined whether or not an end operation by the key input device 46 is performed in a step S37. If the end operation is not performed, the process returns to the step S29 while if an end operation is performed, the imaging task is ended. Thus, an image along the camera setting being compliant with the related image is created.

According to FIG. 9, in a step S41, a browsing destination is initialized, and in a step S43, a browsing mail message is transferred from the flash memory 40 to the RAM 44. In a step S45, an instruction for displaying the text data of the browsing mail message is applied to the LCD driver 36. Thus, the text of the browsing mail message is displayed on the LCD 38.

In a step S47, it is determined whether or not an image is attached to the browsing mail message. If an image is not attached to the browsing mail message, the process proceeds to a step S51 while if an image is attached to the browsing mail message, an image display processing is performed in a step S49. Thus, the text of the browsing mail message and the image of the browsing mail message are displayed on the LCD 38.

In a step S51, it is determined whether or not a change operation is performed. If the change operation is performed, a browsing destination is changed in accordance with the change operation in a step S53 while if a change operation is not performed, it is determined whether or not a reply operation by the key input device 46 is performed in a step S55. If the determination result is affirmative, a reply task is activated in a step S57, and the browsing task is ended. If the determination result is negative, it is determined whether or not an end operation with the key input device 46 is performed in a step S59. If the determination result is negative, the process returns to the step S51 while if the determination result is affirmative, the browsing task is ended.

Referring to FIG. 10 and FIG. 11, in a step S61, a selection screen display processing is executed. In a step S63, it is determined whether or not the "image creation" is selected. If the determination result is affirmative, the process proceeds to a step S67 while if the determination result is negative, it is determined whether or not the "message creation" is selected in a step S65. If the determination result is affirmative, the process proceeds to a step S77 while if the determination result is negative, the process returns to the step S63.

In the step S67, a camera setting processing is executed, in a step S69, an imaging task is activated, and in a step S71, a standby state is held until the end of the imaging task. After completion of the imaging task, in a step S73, the attachment flag is set to an on state, and it is determined whether or not a message creation has been finished in a step S75. If a text according to the message creation processing is stored in the RAM 44, the process proceeds to a step S79 while if a text according to the message creation processing is not stored in the RAM 44, message creation processing is executed in the step S77. Thus, a desired text in response to the input operation by the key input device 46 is stored in the RAM 44.

In the step S79, sending screen display processing is executed, and in a step S81, it is determined whether or not a sending operation is performed. If the sending operation is performed, the process proceeds to a step S85 while if a sending operation is not performed, it is determined whether or not the "image creation" is selected in a step S83. If the determination result is affirmative, the process returns to the step S67 while if the determination result is negative, the process returns to the step S79. In the step S85, text sending processing is executed. Thus, the text stored in the RAM 44 is sent to be directed to a desired destination.

In a step S87, it is determined whether or not the attachment flag is an on state. If the attachment flag is an off state, a reply task is ended while if the attachment flag is an on state, the compressed image data in response to the reply operation is transferred from the flash memory 40 to the RAM 44 in a step S89, and attached image sending processing is executed in a step S91, the attachment flag is set to an off state in a step S93, and the reply task is ended. Thus, the compressed image data transferred to the RAM 44 is sent so as to be directed to the desired destination.

The camera setting processing in the step S67 is executed according to a subroutine shown in FIG. 12. In a step S101, with an image attached to the browsing mail message regarded as a related image, it is determined whether or not there is the related image. If there is no related image attached to the browsing mail message, the process proceeds to a step S105 while if there is a related image attached to the browsing mail message, a camera setting that forms a part of the EXIF information of the related image attached in a step S103 is written to the RAM 44, and the process is restored to the hierarchical upper level of the routine. Thus, the camera setting is adjusted so as to be compliant with the image attached to the browsing mail message.

In the step S105, with an image attached to a sending source mail regarded as a related image, it is determined whether or not there is the related image. That is, it is determined whether or not there is a related image attached to the sending source mail which is sent in the past. Thus, it is possible to make an adjustment to the camera setting so as to be compliant with the related image attached to the sending source mail sent in the past.

If there is the related image attached to the sending source mail, a camera setting that is a part of the EXIF information of the related image attached to the latest sending source mail out of the related images of the sending source mails is written to the RAM 44 in a step S107, and the process is restored to the hierarchical upper level of the routine. Thus, the camera setting is adjusted so as to be compliant with the latest camera setting of the opposite party.

If there is no related image attached to the sending source mail, a camera setting is read from the flash memory 40 in a step S109, the read camera setting is written to the RAM 44 through the memory controller 42, and the process is restored to the hierarchical upper level of the routine.

As understood from the above description, sending and receiving mail messages are realized by the radio circuit 14 and the signal processing circuit 16. The CPU 28 designates any one of the mail messages received by the radio circuit 14 and the signal processing circuit 16 as a browsing mail message, and determines whether or not there is a related image relating to the browsing mail message.

The CPU 28 validates a defined camera setting when the determination result is negative, and validates a camera setting being compliant with the related image when the determination result is affirmative. Succeedingly, the CPU 28 creates an image along the validated camera setting. The created image is attached to the mail message taking the sending source of the browsing mail message as a destination.

Accordingly, if there is no related image, an image is created along the defined camera setting. On the other hand, if there is a related image, an image is created along the camera setting being compliant with the related image. The image thus created is attached to the mail message taking the sender of the browsing mail message as a destination. Thus, it is possible to send an image to the opposite party with consideration given to the camera setting of the communication terminal of the opposite party.

Additionally, in this embodiment, a description is made on that when there is a related image attached to the sending source mail, the "display manner" is adjusted by noting the latest sending source mail. Without being limited to the above description, by replacing the process in the step S107 in FIG. 12 with the process described later, the camera setting can be adjusted to an optimal camera setting based on the sending source mail recorded in the flash memory 40.

A mobile communication terminal with camera 10 of another embodiment is the same as the embodiment shown in FIG. 1-FIG. 12 except for the points described later, and therefore, a description relating to the same configuration is omitted.

Figure 13:
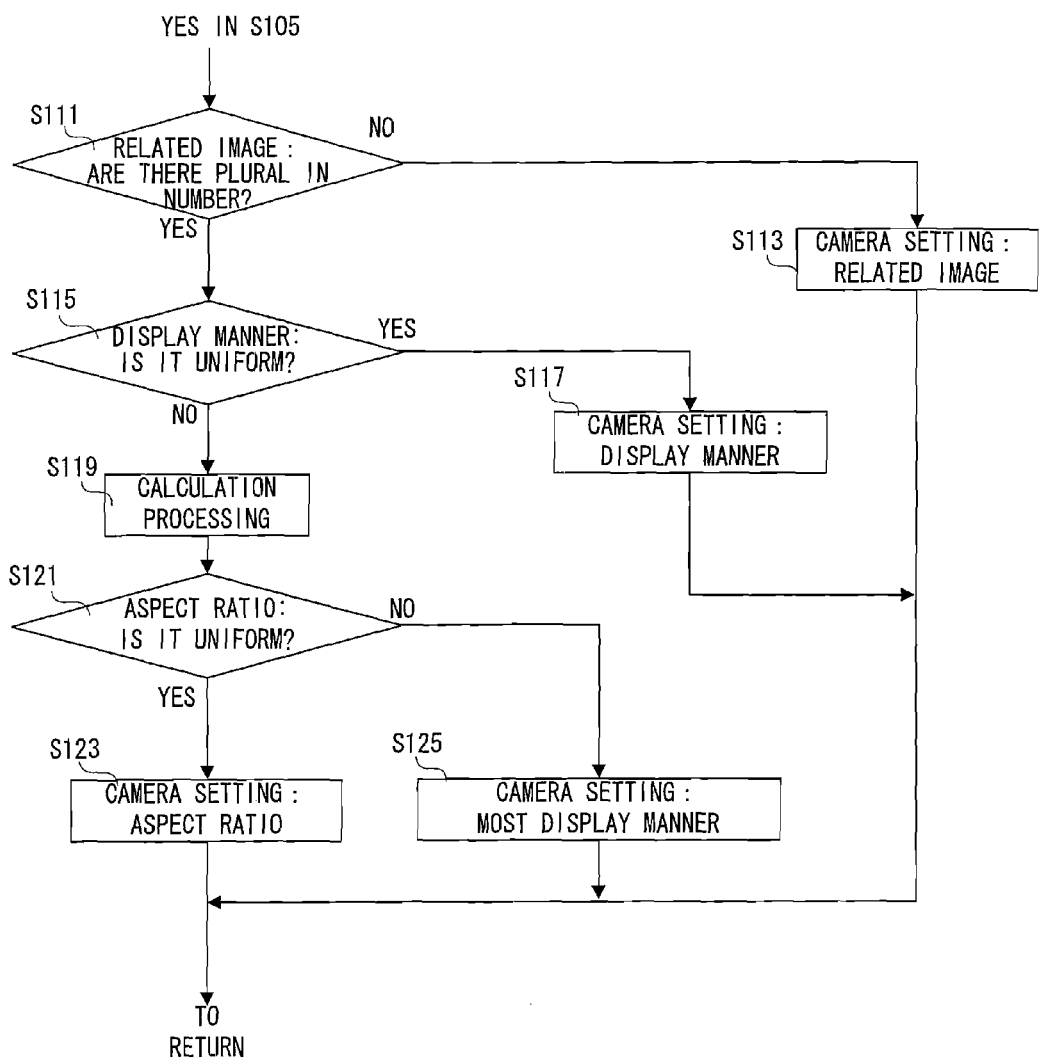
FIG. 13 is a flowchart showing one example of an operation of the CPU 28 applied to another embodiment.

Referring to FIG. 13, if a group of mail messages has a related image, it is determined whether or not a related image attached to the sending source mail is plural in number in a step S111. If the determination result is negative, it is considered that the related image attached to the sending source mail is one, and in a step S113, the camera setting forming a part of the EXIF information of the related image attached to the sending source mail is written to the RAM 44. If the determination result is affirmative, it is considered that a related image attached to the sending source mail is plural in number, and it is determined whether or not the "display manner" of the plurality of related images is uniform in a step S115. If the "display manner" of the plurality of related images is uniform, a camera setting corresponding to the "display manner" of the related image attached to the sending source mail is written to the RAM 44 in a step S117. Thus, the camera setting is adjusted so as to be compliant with the "display manner" included in the camera setting of the opposite party.

If the "display manner" of the plurality of related images is not uniform, calculation processing is executed in a step S119. That is, an aspect ratio is calculated from the "display manner" of the plurality of related images. In a step S121, it is determined whether or not an aspect ratio based on the "display manner" of the plurality of related images is uniform. If the aspect ratio is uniform, a camera setting corresponding to the aspect ratio based on the "display manner" of the related image attached to the sending source mail is written to the RAM 44 in a step S123. Thus, the camera setting is adjusted so as to be compliant with the aspect ratio included in the camera setting of the opposite party.

If the aspect ratio is diverse, the camera setting corresponding to most "display manner" out of the "display manners" of the plurality of related images is written to the RAM 44 in a step S125. Thus, the camera setting is adjusted so as to be complaint with the "display manner" included in the camera setting frequently utilized by the opposite party.

After completion of the processing in each of the steps S113, S117, S123 and S125, the process proceeds to the step S63. Thus, it is possible to adjust to the optimal camera setting on the basis of the sending source mail recorded in the flash memory 40.

As described above, a communication terminal with camera according to this invention comprises a communicator for executing sending and receiving processing of mail messages; a designator for designating any one of the mail messages received by the communicator as a browsing mail message; a determiner for determining whether or not there is a related image relating to the browsing mail message; a first validator for validating a defined camera setting when a determination result by the determiner is negative; a second validator for validating a camera setting being compliant with the related image when a determination result by the determiner is affirmative; a creator for creating an image being compliant with the camera setting validated by the first validator or the second validator; and an attacher for attaching the image created by the creator to a mail message taking a sending source of the browsing mail message as a destination.

In a communication terminal with camera (10: reference numeral designating a corresponding portion in the embodiments. The same is true for the following description.) according to the present invention, sending and receiving mail messages is executed by a communicator (14, 16). A designator (S41, S53) designates any one of the mail messages received by the communicator as a browsing mail message, and a determiner (S101, S105, S111, S115, S121) determines whether or not there is a related image relating to the browsing mail message.

When the determination result by the determiner is negative, the defined camera setting is validated by a first validator (S109). On the other hand, when a determination result by the determiner is affirmative, a camera setting being compliant with the related image relating to the browsing mail message is activated by a second validator (S103, S107, S113, S123, S125). A creator (S33-S37) creates an image being compliant with the camera setting validated by the first validator or the second validator. The created image is attached by attacher (S89, S91) to a mail message taking a sending source of the browsing mail message as a destination.

Accordingly, if there is no related image, an image is created along the defined camera setting. On the other hand, if there is a related image, an image is created along an image being compliant with the related image. The image thus created is attached to a mail message taking a sender of the browsing mail message as a destination. Thus, it is possible to send an image to the opposite party with consideration given to the camera setting of the communications terminal at the opposite party.

A communication terminal with camera according to a second invention is dependent on the first invention, and the determiner includes a first determiner for executing determination processing of regarding the image attached to the browsing mail message as the related image.

According to the second invention, a first determiner (S101) included in the determiner regards an image attached to the browsing mail message as a related image, and notes whether or not there is the related image. When there is an image attached to the browsing mail message, the second validator validates a camera setting being compliant with the second validator. Thus, the camera setting is adjusted so as to be compliant with the image attached to the browsing mail message.

A communication terminal with camera according to a third invention is dependent on the first or the second invention, and the determiner further includes a second determiner for executing determination processing of regarding an image attached to a sending source mail sent by a source of the browsing mail message as the related image.

According to the third invention, the second determiner (S105, S111, S115, S121) included in the determiner regards an image attached to a sending source mail sent by a source of the browsing mail message sent in the past as the related image, and notes whether or not there is the related image. Thus, the camera setting can be adjusted so as to be compliant with an image attached to the sending source mail sent in the past.

A communication terminal with camera according to a fourth invention is dependent on any one of the first to the third inventions, and the related image is a latest image out of images attached to the sending source mail. Thus, the camera setting can be adjusted so as to be compliant with the latest image of the opposite party.

A communication terminal with camera according to a fifth invention is dependent on any one of the first to the fourth inventions, and the camera setting includes a display manner as an imaging parameter, and the display manner defines a reading area formed on an imaging surface capturing an optical image of an object scene. Thus, an imaging parameter of the camera setting to be noted by the second validator is specified.

A communication terminal with camera according to a sixth invention is dependent on the fifth invention, and the second determiner includes a display manner determiner for determining whether or not the related image has a uniform display manner. By the display manner determiner (S115), the camera setting can be adjusted so as to be compliant with the display manner included in the camera setting of the opposite party.

A communication terminal with camera according to a seventh invention is dependent on the fifth or the sixth invention, and further comprises a calculator for calculating an aspect ratio from the display manner, and the second determiner further includes an aspect ratio determiner for determining whether or not the related image has an uniform aspect ratio. As a result of being provided with the calculator (S119) and the aspect ratio determiner (S121), an aspect ratio belonging to each related image can be noted.

A communication terminal with camera according to an eighth invention is dependent on the seventh invention, and the second validator validates a camera setting being compliant with the aspect ratio out of the camera settings of the communication terminal of the opposite party when a determination result by the aspect ratio determiner is affirmative.

According to the eighth invention, the second validator (S123) notes the aspect ratio of the related image when a determination result by the aspect ratio determiner is affirmative. Thus, the camera setting is adjusted so as to be compliant with the aspect ratio included in the camera setting of the opposite party.

A communication terminal with camera according to a ninth invention is dependent on the seventh invention, and the second validator validates a camera setting being compliant with most display manner out of display manners of the related image when an determination result by the aspect ratio determiner is negative.

According to the ninth invention, when the determination result by the aspect ratio determiner is negative, the second validator (S125) notes most display manner out of display manners of the related image. Thus, the camera setting can be adjusted so as to be compliant with the display manner included in the camera setting frequently used by the opposite party.

An operation control program according to a tenth invention causes a processor of a communication terminal with camera having a communicator for executing sending and receiving processing of mail messages to execute: a designating step for designating any one of the mail messages received by the communicator as a browsing mail message; a determining step for determining whether or not there is a related image relating to the browsing mail message; a first validating step for validating a defined camera setting when a determination result by the determining step is negative; a second validating step for validating a camera setting being compliant with the related image when a determination result by the determining step is affirmative; a creating step for creating an image along the camera setting validated by the first validating step or the second validating step; and an attaching step for attaching the image created by the creating step to a mail message taking a sending source of the browsing mail message as a destination.

An operation controlling method according to an eleventh invention is an operation controlling method of a communication terminal with camera having a communicator for executing sending and receiving processing of mail messages includes following steps of: a designating step for designating any one of the mail messages received by the communicator as a browsing mail message; a determining step for determining whether or not there is a related image relating to the browsing mail message; a first validating step for validating a defined camera setting when a determination result by the determining step is negative; a second validating step for validating a camera setting being compliant with the related image when a determination result by the determining step is affirmative; a creating step for creating an image along the camera setting validated by the first validating step or the second validating step; and an attaching step for attaching the image created by the creating step to a mail message taking a sending source of the browsing mail message as a destination.

In the tenth invention or the eleventh invention also, if there is no related image, an image is created along the defined camera setting. On the other hand, if there is the related image, an image is created along the camera setting being compliant with the related image. The image thus created is attached to a mail message taking a sender of the browsing mail message as a destination. Thus, it is possible to send an image to the opposite party with consideration given to the camera setting of the communications terminal of the opposite party.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication terminal with a camera comprising:
   a communicator for the processing of sent and received mail messages;
   a designator for designating any one of the mail messages received by said communicator as a browsing mail message, wherein said browsing mail message is transferred to a storage medium;
   a determiner for determining whether there is an image related to said browsing mail message based on information of said browsing mail stored in the storage medium;
   a first validator for validating a defined camera setting when a determination result by said determiner is negative;
   a second validator for validating a camera setting as compliant with said related image when a determination result by said determiner is affirmative, while reading image data related to the browsing mail message from the storage medium;
   a creator for creating an image compliant with the camera setting validated by one of said first validator and said second validator; and
   an attacher for attaching the image created by said creator to a mail message using a sending source of said browsing mail message as a destination.

2. A communication terminal with a camera according to claim 1, wherein said determiner includes a first determiner for executing determination processing whether or not there is the related image attached to the browsing mail message.

3. A communication terminal with a camera according to claims 1 or 2, wherein said determiner further includes a second determiner for executing determination processing whether or not there is the related image attached to a sending source mail sent by a source of said browsing mail message in the past as said related image.

4. A communication terminal with a camera according to claims 1 or 2, wherein said related image is a latest image out of images attached to said sending source mail.

5. A communication terminal with a camera according to claims 1 or 2, wherein said camera setting includes a display manner as an imaging parameter, and said display manner defines a reading area formed on an imaging surface capturing an optical image of an object scene.

6. A communication terminal with a camera according to claim 3, wherein said second determiner includes a display manner determiner for determining whether or not said related image has a uniform display manner.

7. A communication terminal with a camera according to claim 6, further comprising a calculator for calculating an aspect ratio from said display manner, wherein said second determiner further includes an aspect ratio determiner for determining whether or not said related image has a uniform aspect ratio.

8. A communication terminal with a camera according to claim 7, wherein said second validator validates a camera setting as compliant with the aspect ratio of said related image when a determination result by said aspect ratio determiner is affirmative.

9. A communication terminal with a camera according to claim 7, wherein said second validator validates a camera setting as compliant with most display areas out of available display areas of said related image when a determination result by said aspect ratio determiner is negative.

10. The communication terminal with a camera according to claim 1, wherein raw image signals are converted into image data in the form of digital data which is compressed by compression processing associated with JPEG compression.

11. A non-transitory storage medium which is readable by a processor and stores an operation control program which causes the processor of a communication terminal with a camera having a communicator for executing sending and receiving processing of mail messages to execute:
   a designating step for designating any one of the mail messages received by said communicator as a browsing mail message, wherein said browsing mail message is transferred to a storage medium:
   a determining step for determining whether there is a related image relating to said browsing mail message based on information of said browsing mail stored in the storage medium;

a first validating step for validating a defined camera setting when a determination result by said determining step is negative;

a second validating step for validating a camera setting as compliant with said related image when a determination result by said determining step is affirmative, while reading image data related to the browsing mail message from a storage medium;

a creating step for creating an image compliant with the camera setting validated by one of said first validating step and said second validating step; and an attaching step for attaching the image created by said creating step to a mail message using a sending source of said browsing mail message as a destination.

12. An operation controlling method of a communication terminal with camera having a communicator for executing sending and receiving processing of mail messages including following steps of:

a designating step for designating any one of mail messages received by said communicator as a browsing mail message, wherein said browsing mail message is transferred to a storage medium;

a determining step for determining whether there is an image relating to said browsing mail message based on information of said browsing mail stored in the storage medium;

a first validating step for validating a defined camera setting when a determination result by said determining step is negative;

a second validating step for validating a camera setting as compliant with said related image when a determination result by said determining step is affirmative, while reading image data related to the browsing mail message from a storage medium;

a creating step for creating an image compliant with the camera setting validated by said first validating step or said second validating step; and an attaching step for attaching the image created by said creating step to a mail message using a sending source of said browsing mail message as a destination.

* * * * *